(12) United States Patent
Jackson et al.

(10) Patent No.: US 8,539,478 B2
(45) Date of Patent: Sep. 17, 2013

(54) DYNAMIC WEB INSTALLER

(75) Inventors: Ralph Thomas Jackson, Tucson, AZ (US); Wazim Imrhan Reid, Tucson, AZ (US); Ashaki Ayanna Ricketts, Tucson, AZ (US); Teresa Shen Swingler, Tucson, AZ (US); Nedzad Taljanovic, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1349 days.

(21) Appl. No.: 12/142,873

(22) Filed: Jun. 20, 2008

(65) Prior Publication Data

US 2009/0320017 A1   Dec. 24, 2009

(51) Int. Cl.
 *G06F 9/44*   (2006.01)
 *G06F 9/445*   (2006.01)

(52) U.S. Cl.
 USPC ............ 717/174; 717/120; 717/175; 717/177

(58) Field of Classification Search
 USPC ....................................................... 717/168
 See application file for complete search history.

(56) References Cited

U.S. PATENT DOCUMENTS

| 6,117,187 | A  | * | 9/2000  | Staelin        | 717/169 |
|-----------|----|---|---------|----------------|---------|
| 6,266,811 | B1 | * | 7/2001  | Nabahi         | 717/174 |
| 6,324,691 | B1 | * | 11/2001 | Gazdik         | 717/178 |
| 6,401,241 | B1 | * | 6/2002  | Taylor         | 717/174 |
| 6,865,737 | B1 | * | 3/2005  | Lucas et al.   | 717/178 |
| 7,069,271 | B1 |   | 6/2006  | Fadel et al.   |         |
| 7,177,920 | B1 | * | 2/2007  | Brown, Jr.     | 709/220 |
| 7,549,149 | B2 | * | 6/2009  | Childress et al. | 717/177 |
| 7,765,541 | B1 | * | 7/2010  | Noordergraaf et al. | 717/175 |
| 2003/0226138 | A1 | * | 12/2003 | Luu         | 717/175 |
| 2004/0034850 | A1 | * | 2/2004  | Burkhardt et al. | 717/120 |
| 2004/0139430 | A1 | * | 7/2004  | Eatough et al. | 717/174 |
| 2005/0044545 | A1 | * | 2/2005  | Childress et al. | 717/177 |
| 2005/0066324 | A1 | * | 3/2005  | Delgado et al. | 717/170 |
| 2005/0235282 | A1 | * | 10/2005 | Anderson    | 717/178 |
| 2006/0031831 | A1 | * | 2/2006  | Templin et al. | 717/175 |
| 2006/0123414 | A1 | * | 6/2006  | Fors et al.    | 717/177 |
| 2006/0176499 | A1 |   | 8/2006  | Shintoku       |         |
| 2007/0271552 | A1 | * | 11/2007 | Pulley         | 717/120 |
| 2008/0114860 | A1 | * | 5/2008  | Keys et al.    | 709/219 |

(Continued)

FOREIGN PATENT DOCUMENTS

| WO | WO02096074 A2 | 11/2002 |
|----|---------------|---------|
| WO | WO03034261 A1 | 4/2003  |

(Continued)

OTHER PUBLICATIONS

Hardeep Singh, Create and install packages using the DB2 Install Utility, 2007, pp. 1-6.*

(Continued)

*Primary Examiner* — Thuy Dao
*Assistant Examiner* — Mongbao Nguyen
(74) *Attorney, Agent, or Firm* — Terrile, Cannatti, Chambers & Holland, LLP; Stephen A. Terrile

(57) ABSTRACT

A dynamic web installer, in which a user selects components via an external input selector (e.g. a web page) and, based on those selections, generates a custom installer to include only the components requested by the user. The user can then retrieve this installer and perform the installation.

14 Claims, 4 Drawing Sheets

(56) References Cited

U.S. PATENT DOCUMENTS

2008/0201703 A1* 8/2008 Lerum et al. .................. 717/172
2008/0320468 A1* 12/2008 Ferris et al. ................... 717/174
2009/0133013 A1* 5/2009 Criddle et al. ................. 717/174

FOREIGN PATENT DOCUMENTS

| WO | WO2004032479 A2 | 4/2004 |
| WO | WO2006075230 A1 | 7/2006 |
| WO | WO2006087262 A1 | 8/2006 |
| WO | WO2007002848 A2 | 1/2007 |

OTHER PUBLICATIONS

Symantec, Windows Installer (.msi) command-line reference for Symantec Client Security 2.0, 2005, pp. 1-6.*
Altiris, Windows Installer Editor Reference, 1994, pp. 436-452.*

* cited by examiner

DYNAMIC WEB INSTALLER

BACKGROUND OF THE INVENTION

1. Field of the Invention

The present invention relates in general to the field of computers and similar technologies, and in particular to software utilized in this field. Still more particularly, the present invention relates to a dynamic web installer.

2. Description of the Related Art

The popularity of the World Wide Web ("Web") has made the Internet an important media for mass communication. The Web is used for many applications such as information retrieval, personal communication, and electronic commerce and has been rapidly adopted by a fast growing number of Internet users in a large part of the world.

Using the Web, users can access remote information by receiving web pages through the Hypertext Transfer Protocol (HTTP). The information in a web page is described using the Hypertext Markup Language (HTML) and eXtensive Markup Language (XML), and is displayed by software called a web browser. Web pages may be considered static if they do not include any logic that can dynamically change their appearances or provide computations based on user input.

One issue relating to processing of software applications is the software installation process. Typically, the installation of a software application is achieved by a special-purpose program which comes with the software and is written only for the purpose of installing this software. This method of software installation means that developers for each software application often have to write a specific install program just to install their software. In general, an install program for an application configures a list of settings that are used to establish a proper environment or context for this application before it can be properly installed. These settings may include, for example, the basic operating system setup such as the registry entries, location setup such as the directory or folder in which the application is to be stored, link setup such as the short-cut link to this application, the graphic setup such as the icon of this application, and the dependency setup such as other applications that this application depends on for execution.

With the advent of the paradigm of componentization of software applications, the installation of software applications can be customized to provide an amount of code a customer desires. However, some users may want to install all possible components of a software application. Typically, such an installation can require an installer program to include all components, which can result in a large disk footprint for the installer (i.e., a relatively large amount of disk memory being used to store the code). This paradigm can lead a user that does not require all possible components of the application to retrieve an installer that includes support for all the components. Even though the user has the option to install a subset of the components included in the installer, the user often must allocate disk space for all components included in the installer, regardless of whether they plan on installing every component or not. This means that disk resources are being utilized by code, inside the installer, that the user never plans to use. In the same scenario, if the installer is retrieved from the Web, network resources are utilized to transfer code inside the installer, which the user never plans to use.

One alternative to this process is for a user to retrieve a single installer for each component. This also is not optimal since the user will likely be performing repetitive actions to complete all the installations they desire.

SUMMARY OF THE INVENTION

In accordance with the present invention, a dynamic web installer system is set forth in which a user selects components via an external input selector (e.g., a web page) and, based on those selections, the web installer generates a custom installer that includes only the components selected by the user. The user can then retrieve this custom installer and perform the installation of the selected components.

More specifically, in one embodiment, the invention relates to a computer-implementable method including enabling selection of a plurality of components for installation onto a system, executing an install creation utility that creates an installable package and installs applications for each of the plurality of components that were selected, enabling a user to execute the installable package, the installable package installing the plurality of components onto the system upon execution of the installable package.

In another embodiment, the invention relates to a system including a processor, a data bus coupled to the processor and a computer-usable medium embodying computer program code. The computer-usable medium is coupled to the data bus. The computer program code comprises instructions executable by the processor and configured for enabling selection of a plurality of components for installation onto a system, executing an install creation utility to create an installable package that installs applications for each of the plurality of components, enabling a user to execute the installable package, the installable package installing the plurality of components onto the system upon execution of the installable package.

In another embodiment, the invention relates to a computer-usable medium embodying computer program code. The computer program code comprising computer executable instructions configured for enabling selection of a plurality of components for installation onto a system, executing an install creation utility to create an installable package that installs applications for each of the plurality of components, enabling a user to execute the installable package, the installable package installing the plurality of components onto the system upon execution of the installable package.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
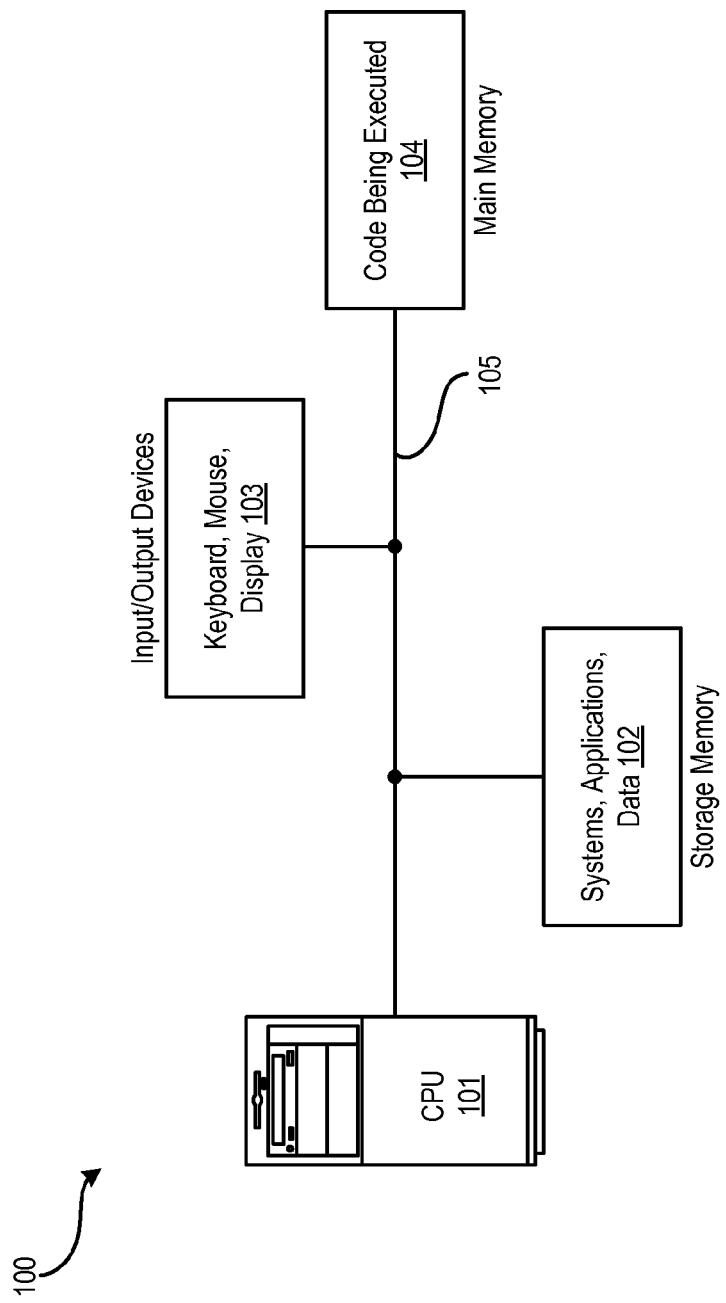
FIG. 1 shows an example of an architecture of a server or a client of the present invention.

Referring initially to FIG. 1, an example of a computing device 100 that is capable of implementing the features of the present invention is shown. This computing device can be, for example, a PC (personal computer), a workstation, or a mainframe, and may typically include elements such as: one or more processors, e.g., CPUs (central processing units) 101; input and output devices 103 such as a keyboard, a mouse and a display device; main memory 104 such as RAM (random access memory); and storage memory 102 such as disks. These elements are interconnected through a bus 105. As is known, the main memory 104 stores code being executed by the CPU and the storage memory 102 serves as the permanent storage for the systems (such as the operating system), the applications (such as the software system of the present invention), as well as the data.

It will be appreciated that the term processor is intended to include any processing device such as, for example, one that includes a CPU (as illustrated in FIG. 1) and/or other processing circuitry. The term memory is more generally intended to include memory associated with a processor or CPU, such as, for example, RAM (as illustrated in FIG. 1), ROM, a fixed memory device such as a hard disk (as illustrated in FIG. 1), a removable memory device (e.g., diskette), flash memory, etc. In addition, the term input and output devices is more generally intended to include any computer-based input and output devices, for example, one or more input devices, e.g., keyboard and mouse (as illustrated in FIG. 1), for entering data to the processing unit, and/or one or more output devices, e.g., display (as illustrated in FIG. 1) and/or printer, for presenting results associated with the processing unit. It will also be appreciated that the term processor may refer to more than one processing device and that various elements associated with a processing device may be shared by other processing devices. Accordingly, software components including instructions or code for performing the methodologies of the invention may be stored in one or more of the associated memory devices (e.g., ROM, fixed or removable memory) and, when ready to be utilized, loaded in part or in whole (e.g., into RAM) and executed by a CPU.

Figure 2:
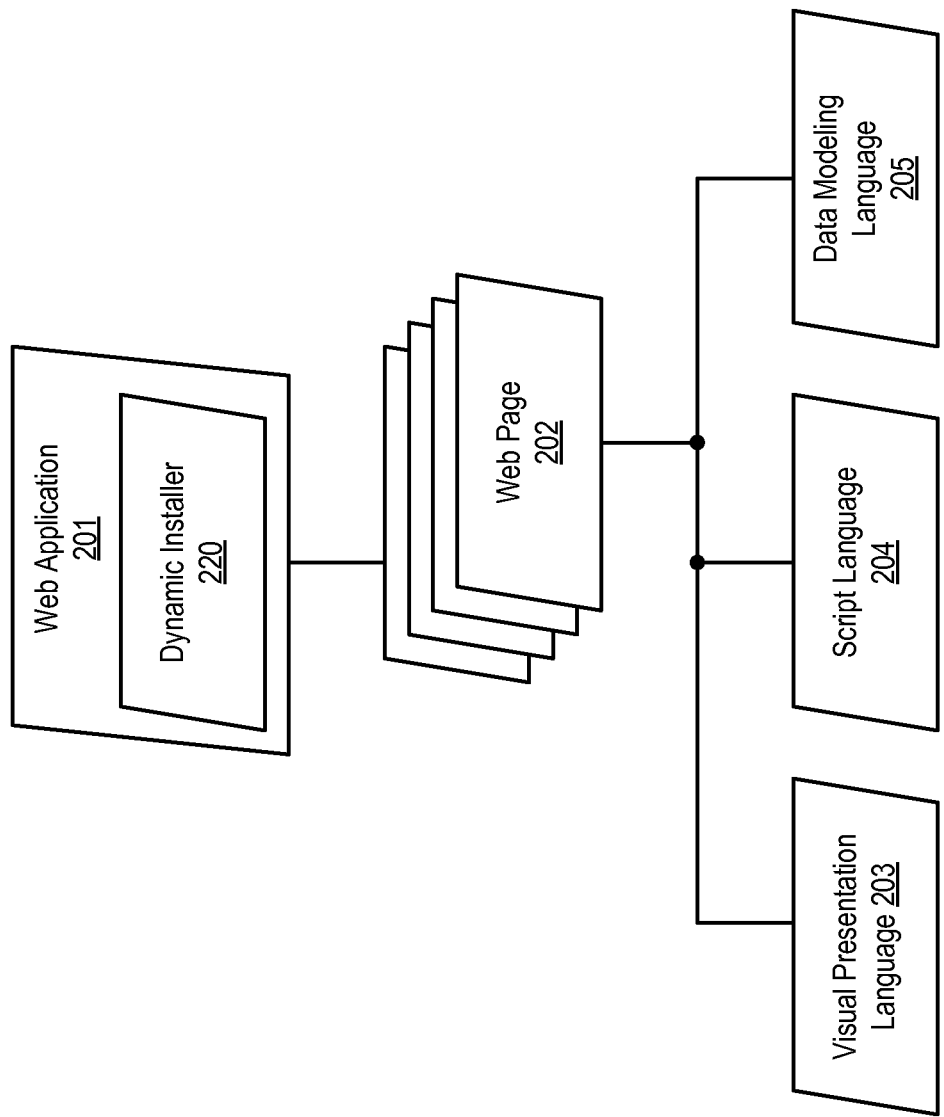
FIG. 2 shows is an example of an architecture of a web application of the present invention.

Referring now to FIG. 2, an example of a web application is shown. As shown, a web application 201 comprises one or more web pages 202. In certain embodiments, each web page 202 of a web application 201 contains text composed in any combinations of three types of languages: a visual presentation language 203, a script language 204 and a data modeling language 205. The web application includes a dynamic web installer 220.

The visual presentation language 203 is used to provide a graphic user interface (GUI) on the browser window. It can be used to visually present the text or linked objects (such as a voice or a graphic file), to receive user input, and transfer data to and from a remote host through web browser. Those skilled in the art will appreciate that currently the most commonly used visual presentation language for browsers is HTML and the data transfer protocol used by browsers is HTTP.

A script interpreter is used to parse and interpret the text of the web page that is written in the script language 204. Those skilled in the art will appreciate that currently a commonly used script language in web pages is JavaScript. Script in a web page provides a way to embed logic that creates dynamic visual displays or conducts immediate computations when its web page is processed. Traditional script language used in web pages is limited to the browser functions and HTML elements. According to a feature of the present invention, the script language used in a web application can be extended to contain function calls that have access to a full range of operating system resources, including those beyond the browser contexts.

The data modeling language 205 is used to describe certain data in web applications such that their structures and definitions of data elements inside them can be easily applied by other applications that understand the same language and uses the same definitions for data elements. This way no specialized code is needed to decode data received from other applications. Those skilled in the art will appreciated that currently the most common language used for data modeling on the Web is XML.

The dynamic web installer 220 enables a user to select components via the web page and, based on those selections, generates a custom installer (i.e., an installable package). The installable package includes only the components requested by the user. The user can then retrieve this installable package and perform the installation.

Figure 3:
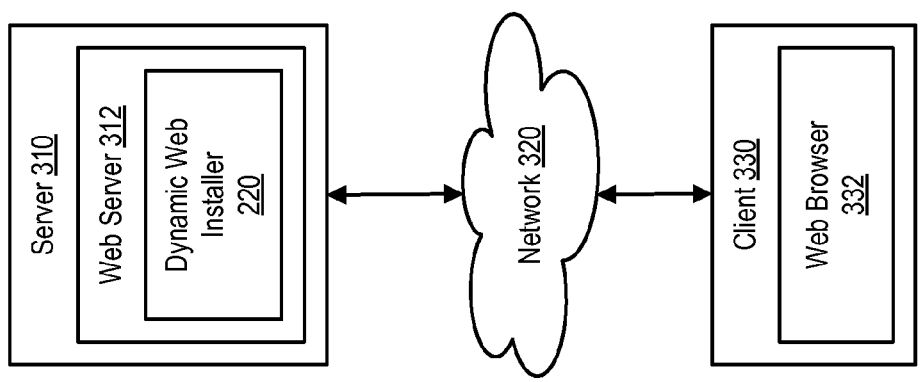
FIG. 3 shows an example of an architecture of a web application process system of the present invention.

Referring to FIG. 3, a system architecture is shown. In this system architecture, the system comprises a plurality of components. More specifically, the system architecture includes a server system 310 which may provide web server functionality 312. The dynamic web installer 220 may reside on and be executed by the web server 312. The server 310 may be coupled via a network 320, such as the Internet, to a client system 330. The client system 330 may be, e.g. a computer system 100. The client system 330 executes a program such as a web browser 332, which enables the client system to access the web server 312. The client system 330 may thus access in interact with the dynamic web installer 220 to download an installable package.

Those skilled in the art will appreciate that there are a number of ways for one software module to drive other software modules. For example, in an object-oriented approach, with all modules modeled as classes, a driving class can create an instance of a driven class and calls the methods associated with this driven class to invoke the behavior of the former. In a non-object-oriented approach, the driven modules can be invoked by the driving module through the API functions provided by the former.

Figure 4:
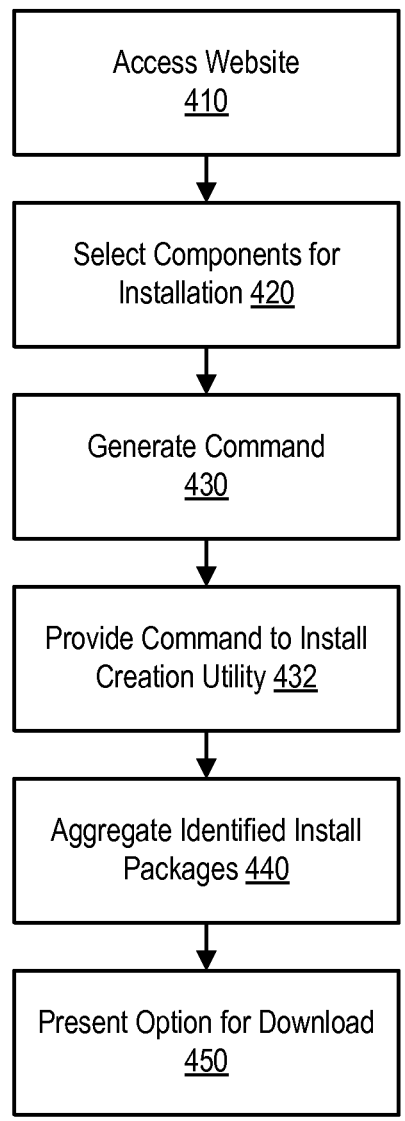
FIG. 4 shows a flow chart of the operation of a dynamic web installer.

Referring to FIG. 4, a flow chart of the operation of a dynamic web installer is shown. More specifically, when desiring to install application components, a user accesses a website to download an installer for software at step 410. On the website, a user is presented with a plurality of component selections from which the user can select components of software for which installation is desired at step 420. Each of the selected components represents an individual install package on the website. Using the selected component names, the dynamic web installer generates a command representing the components to be installed at step 430. The command is provided to an install creation utility that resides on the website at step 432.

The install creation utility uses the names included within the command to aggregate the identified install packages into a single installable package on the website at step 440. The installable package then presents an option for download to the user at step 450. By dynamically generating this install package, the dynamic web installer allows a user to select individual components for which install is desired while only needing to execute a single install package and a corresponding single install application.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method comprising:
    enabling selection of a plurality of components for installation onto a system;
    executing an install creation utility, the install creation utility creating an installable package comprising install applications for each of the plurality of components;
    enabling a user to execute the installable package, the installable package installing the plurality of components onto the system upon execution of the installable package; and wherein
    the executing the install creation utility further comprises:
        executing an install creation command, the install creation command representing the components to be installed, the install creation command comprising a list of names representing the components to be installed; and
        dynamically generating the installable package based upon the list of names.

2. The method of claim 1, wherein the enabling selection further comprises:
    presenting a user with a plurality of component selections, each of the plurality of component selections representing an individual install package.

3. The method of claim 1, wherein the executing the install creation utility further comprises:
    aggregating install packages for each of the identified components to be installed.

4. The method of claim 1, wherein the enabling the user to execute the installable package further comprises:
    presenting the user with an option of downloading the installable package onto the system.

5. A system comprising:
    a processor;
    a data bus coupled to the processor; and
    a computer-usable medium embodying computer program code, the computer-usable medium being coupled to the data bus, the computer program code comprising instructions executable by the processor and configured for:
        enabling selection of a plurality of components for installation onto a system;
        executing an install creation utility, install creation utility creating an installable package comprising applications for each of the plurality of components;
        enabling a user to execute the installable package installing the plurality of components onto the system upon execution of the installable package; and wherein
        the instructions for executing the install creation utility are further configured for:
        executing an install creation command, the install creation command representing the components to be installed, the install creation command comprising a list of names representing the components to be installed; and
        dynamically generating the installable package based upon the list of names.

6. The system of claim 5, wherein the instructions for enabling selection are further configured for:
    presenting a user with a plurality of component selections, each of the plurality of component selections representing an individual install package.

7. The system of claim 5, wherein the instructions for executing the install creation utility are further configured for:
    aggregating install packages for each of the identified components to be installed.

8. The system of claim 5, wherein the instructions for enabling the user to execute the install creation utility are further configured for:
    presenting the user with an option of downloading the installable package.

9. A non-transitory computer-usable medium embodying computer program code, the computer program code comprising computer executable instructions configured for:
    enabling selection of a plurality of components for installation onto a system;
    executing an install creation utility, the install creation utility creating an installable package comprising install applications for each of the plurality of components;
    enabling a user to execute the installable package installing the plurality of components onto the system upon execution of the installable package; and wherein
    the executing the install creation utility further comprises:
        executing an install creation command, the install creation command representing the components to be installed, the install creation command comprising a list of names representing the components to be installed; and dynamically generating the installable package based upon the list of names.

10. The non-transitory computer-usable medium of claim 9, wherein the embodied computer program code further comprises computer executable instructions configured for:

presenting a user with a plurality of component selections, each of the plurality of component selections representing an individual install package.

11. The non-transitory computer-usable medium of claim 9, wherein the embodied computer program code further comprises computer executable instructions configured for:

aggregating install packages for each of the identified components to be installed.

12. The non-transitory computer-usable medium of claim 9, wherein the embodied computer program code further comprises computer executable instructions configured for:

presenting the user with an option of downloading the installable package.

13. The non-transitory computer usable medium of claim 9, wherein the computer executable instructions are deployable to a client computer from a server at a remote location.

14. The non-transitory computer usable medium of claim 9, wherein the computer executable instructions are provided by a service provider to a customer on an on-demand basis.

* * * * *